Oct. 8, 1968  P. A. FEICK ET AL  3,404,607
MATERIAL HANDLING APPARATUS
Filed Jan. 9, 1967  3 Sheets-Sheet 1
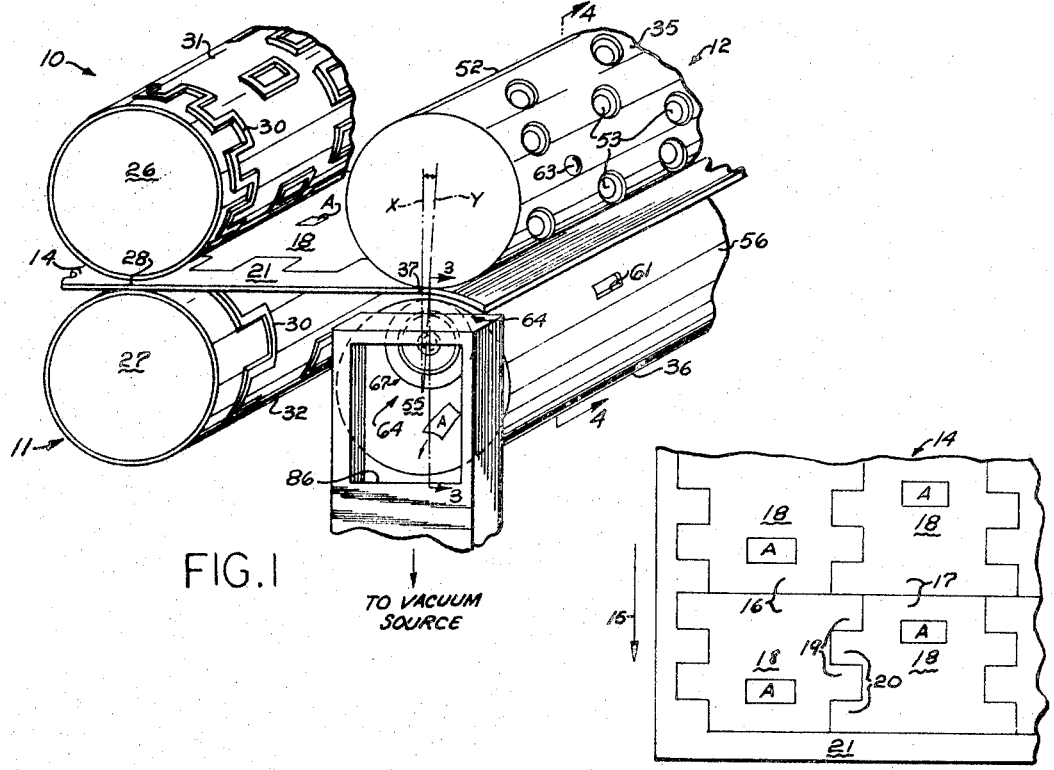
FIG.1
FIG.2
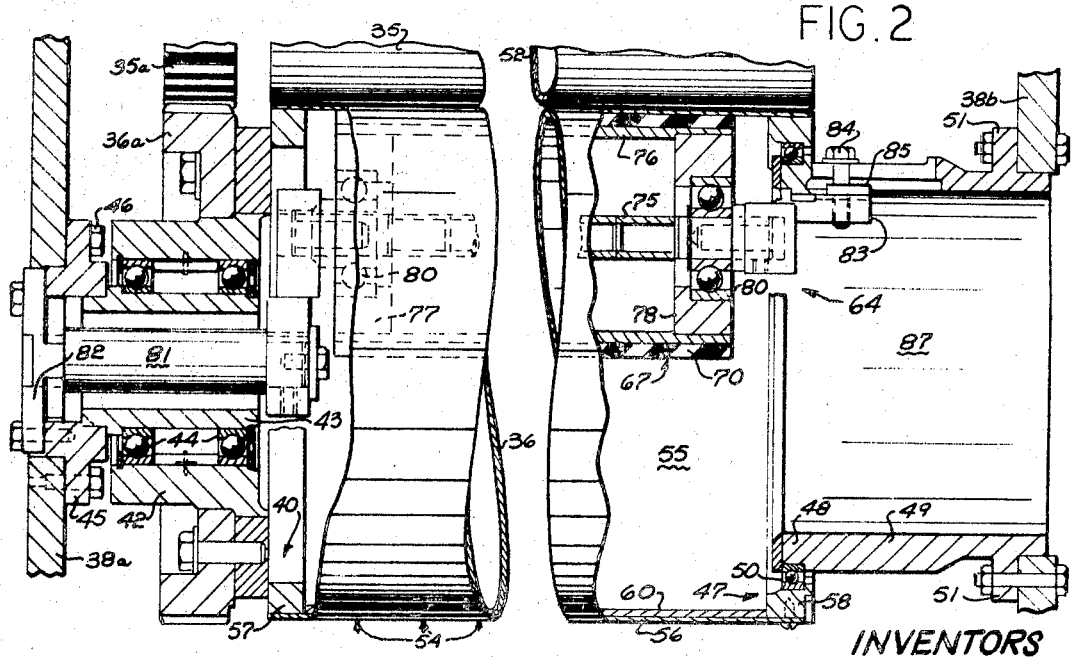
FIG.3
INVENTORS
PAUL A. FEICK
RICHARD W. HELMIG
ALBERT J. SARKA
BY Young, Reavy, Flynn, & Iardlli
ATTORNEYS Oct. 8, 1968 P. A. FEICK ET AL 3,404,607

MATERIAL HANDLING APPARATUS

Filed Jan. 9, 1967 3 Sheets-Sheet 2

INVENTORS
PAUL A. FEICK
RICHARD W. HELMIG
ALBERT J. SARKA

BY *Young, Parry, Flynn, & Tarolli*

ATTORNEYS

Oct. 8, 1968  P. A. FEICK ET AL  3,404,607
MATERIAL HANDLING APPARATUS
Filed Jan. 9, 1967  3 Sheets-Sheet 3
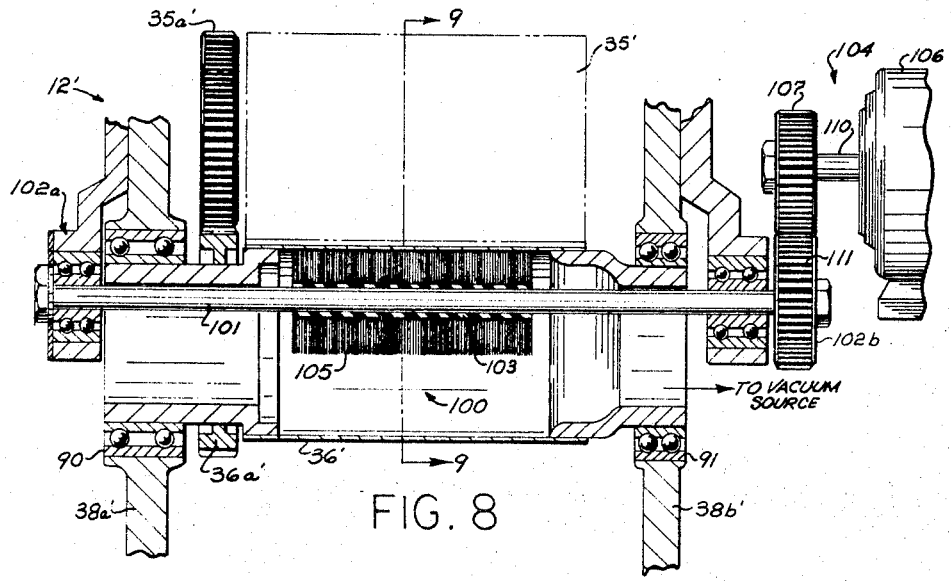
FIG. 8
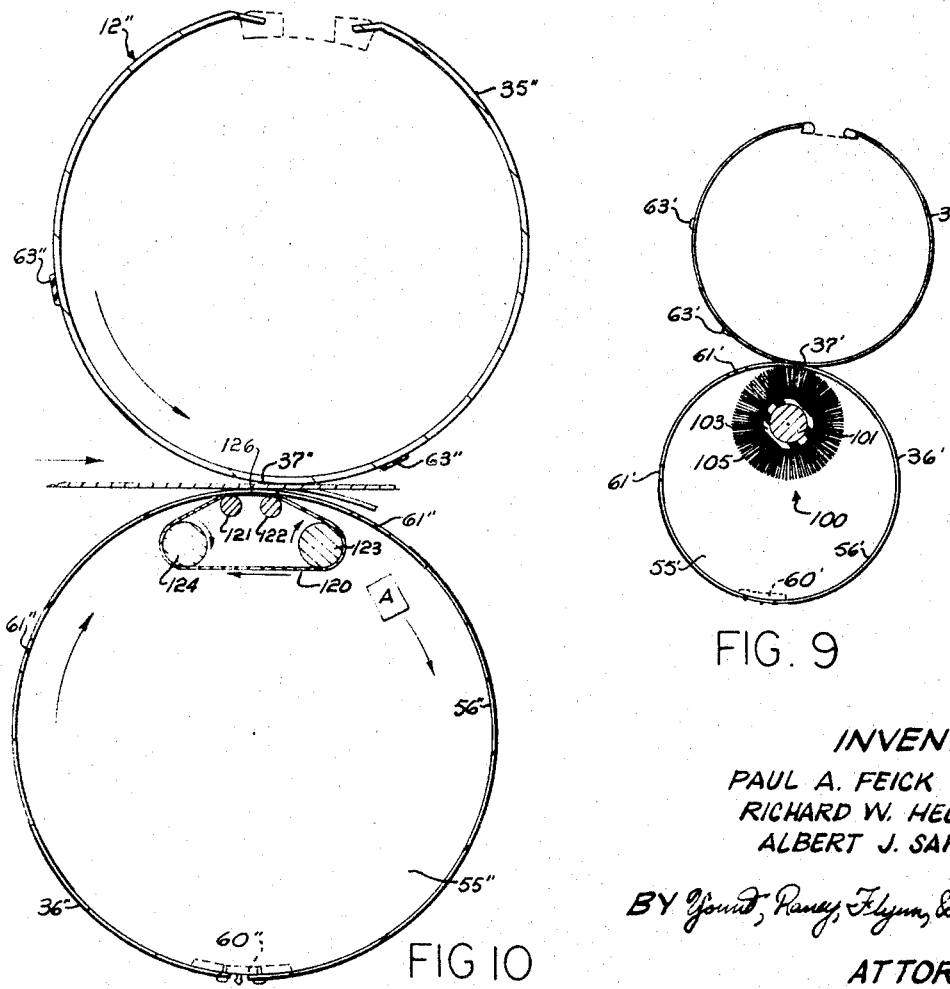
FIG. 9
FIG. 10
INVENTORS
PAUL A. FEICK
RICHARD W. HELMIG
ALBERT J. SARKA
BY Yount, Raney, Flynn, & Tarolli
ATTORNEYS

United States Patent Office 3,404,607
Patented Oct. 8, 1968

3,404,607
MATERIAL HANDLING APPARATUS
Paul A. Feick, Chagrin Falls, Richard W. Helmig, Shaker Heights, and Albert J. Sarka, Fairview Park, Ohio, assignors to Harris-Intertype Corporation, Cleveland, Ohio, a corporation of Delaware
Filed Jan. 9, 1967, Ser. No. 607,934
21 Claims. (Cl. 93—36)

ABSTRACT OF THE DISCLOSURE

A carton blank cylinder and a waste receiving cylinder define a nip therebetween at which carton blanks and waste material portions are separated. The carton blank cylinder includes suckers which engage the carton blanks, and the waste receiving cylinder is hollow and has openings therein through which the waste portions are moved by projections on the carton blank cylinder. A rotating rubber cylinder, moving belts, or a driven brush is located in the waste receiving cylinder to support the waste portions as they are moved by the projections.

---

The present invention relates to a material handling apparatus wherein portions of sheet-like material are separated, and particularly relates to a material stripping apparatus wherein waste is separated from articles cut from sheet-like material.

Certain material handling apparatus for separating waste from articles cut from sheet-like material are known. In United States patent application, Ser. No. 509,754, an apparatus is disclosed which operates to separate waste and articles cut from sheet-like material and which includes a pair of cooperating rotatable cylinders. One of the cylinders, termed the "broke cylinder," has an aperture in its periphery which is registered with an area of the waste while the other cylinder includes a projection, or broke punch, on its periphery registrable with the aperture and which extends into the aperture to push the waste or broke into the broke cylinder, from which it is subsequently removed.

Oftentimes, after cutting of the material, the waste or broke remains connected to the adjacent sheet-like material by thin strips of material, known as stickers. Frequently, when the broke punch engages an area of waste which connected to the adjacent material, the waste is pivoted into the aperture in the broke cylinder and remains connected to the adjacent material rather than being separated therefrom. The pivoting occurs at the location where the sticker connects to the adjacent material. When such broke remains connected to the adjacent material after passing through the stripper nip, it detrimentally affects the movement of the material and material handling problems result.

Accordingly, a principal object of the present invention, is the provision of a new and improved material stripping apparatus operable to separate waste or broke from the adjacent material after the material has been cut and wherein the broke is separated from the adjacent material in a reliable manner at high speeds, and with a minimum probability of the broke remaining connected to the surrounding material even though it has not been completely cut therefrom and remained connected thereto by a sticker after cutting.

A further object of the present invention is the provision of a new and improved apparatus for separating waste from adjacent material, wherein the waste is connected to the adjacent material by a sticker, and including a punch member engageable with one portion of the waste and movable to separate the waste from the adjacent material and a support member engageable with the waste and operable to support the waste so as to prevent pivoting of the waste about the sticker and thus insure breaking of the sticker by the punch.

Another object of the present invention is the provision of a new and improved sheet material stripping apparatus for separating waste from adjacent material including a rotatable member having an aperture in its periphery, a punch member for urging the waste through the aperture in the periphery of the rotatable member, and support means in the rotatable member for engaging and supporting the waste so as to insure separation of the waste from the adjacent material even if the waste was not initially completely cut from the adjacent material.

Another object of the present invention is the provision of a new and improved sheet material stripping apparatus, as noted in the next preceding paragraph, wherein the punch member and support means are cooperable to provide for a shearing of any stickers which may have been connecting the waste to the adjacent material.

A further object of the present invention is the provision of a new and improved broke stripping apparatus including a rotatable broke cylinder having an aperture in its periphery registrable with a waste portion of sheet-like material advancing thereby, a second member registrable with the aperture in the broke cylinder and effective to urge the waste portion into the aperture, and means for supporting the waste portion urged into the aperture to insure separation thereof from the surrounding material including a rotatable cylinder positioned within the broke cylinder and having a peripheral portion engageable with the waste.

A still further object of the present invention is the provision of a new and improved broke stripping apparatus, as set forth in the next preceding paragraph, in which the rotatable cylinder positioned in the broke cylinder comprises a resiliently deflectible material forming the peripheral portion thereof and wherein the rotatable cylinder is driven by frictional engagement between the peripheral portion thereof and an inner periphery of the broke cylinder.

A further object of the present invention is the provision of a new and improved material stripping apparatus including first and second nip forming stripper cylinders, one of the cylinders being hollow and including an aperture in the periphery thereof registrable with a waste portion of the material as it passes through the nip, and the other cylinder having a projection thereon for urging the waste through the aperture, and brush means supported within the one cylinder and having a cylindrical periphery for engaging and supporting the waste portion.

A still further object of the present invention is the provision of a new and improved broke stripping apparatus including first and second rotatable stripper cylinders cooperating to form a nip therebetween, one of the cylinders including an aperture in its periphery registrable with a waste portion of sheet-like material advancing through the nip, the other cylinder including a projection on its periphery operable to urge the waste portion through the aperture, and an endless belt supported within the one cylinder and operable to provide a resilient surface for supporting the waste as it is urged through the aperture and insuring separation thereof from the adjacent material.

Other objects and advantages of the present invention will become apparent from a consideration of the following detailed description thereof and from the accompanying drawings which form a part of the specification and in which:

FIG. 1 is a schematic perspective view of a material handling apparatus embodying the present invention;

FIG. 2 is a plan view of a portion of material adapted to be handled by the apparatus;

FIG. 3 is a sectional view of a portion of the apparatus of FIG. 1 taken approximately at line 3—3;

FIG. 8 is a sectional view of a modified material handling apparatus embodying the present invention;

FIG. 9 is a sectional view of the apparatus of FIG. 8 taken approximately at line 9—9; and FIG. 10 is a sectional view of a modified apparatus embodying the present invention.

Figure 4:
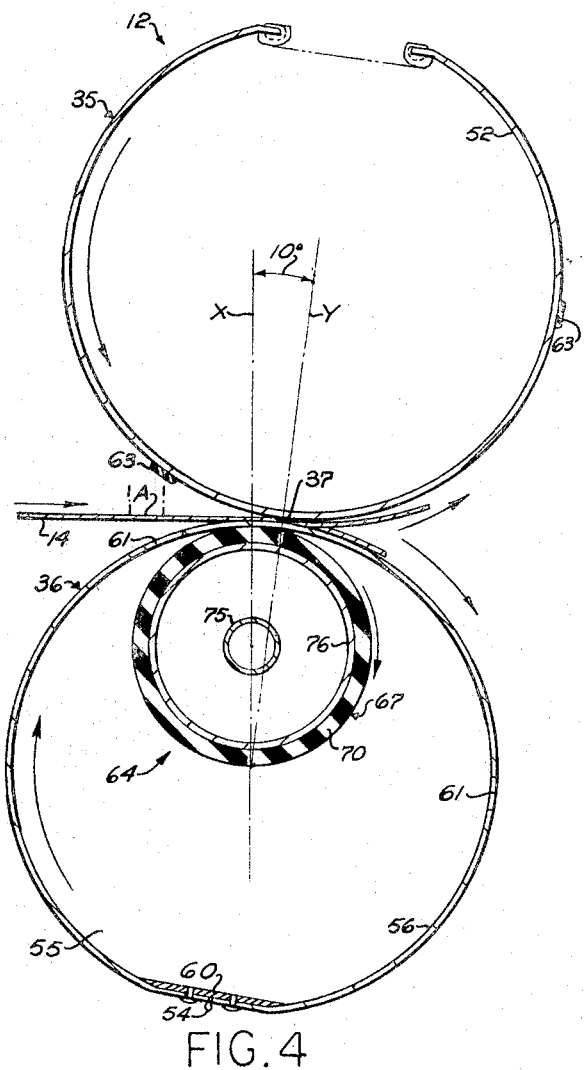
FIG. 4 is a sectional view taken approximately at line 4—4 of FIG. 1.

The present invention provides an improved material handling apparatus which acts on material in either sheet or web form and which material has been cut into articles and waste. More specifically, the invention provides an improved apparatus for separating the articles and waste.

As representing a preferred embodiment of the present invention, FIG. 1 illustrates a material handling apparatus 10 for use in forming and handling carton blanks. The material handling apparatus 10 includes a cutting unit 11 at which sheet-like material in web or sheet form is cut into carton blanks and waste. The material so cut is advanced from the material cutting unit 11 into a stripper unit 12, which is operable to separate the carton blanks from the waste and deliver the carton blanks to a subsequent conveying unit, which has not been shown but which may convey the blanks for subsequent handling operations, such as stacking.

The sheet material preferably processed by the apparatus 10 is cardboard sheet material having the images of carton blanks printed thereon in a closely spaced relation and lying in rows on the material with each row extending transverse to the direction of feed of the material through the apparatus. A portion of a sheet 14 which is to be processed by the apparatus 10, is shown in FIG. 2 with an arrow 15 indicating the direction of feed thereof. The illustrated portion of the sheet 14 includes two columns designated 16, 17 of printed carton blank images, designated 18, which columns extend in the direction of feed of the sheet and with only two carton blanks shown in each of the columns 16, 17. The printed images 18 are arranged on the sheet 14 in a so called "reverse nested" arrangement, that is, where the projections 19 of the images in the column 16 co-extend with similar projections 20 of the images in the column 17. Co-extension of the projections is provided by reversing the direction in which the images in the column 16 face, and results in minimizing scrap material between images. The illustrated number of columns and rows of images and orientation thereof on the sheet 14 is merely exemplary.

Each of the images 18 contains an area, designated A, to be removed from the finished carton blank to provide an opening therein and which portions are termed "internal waste," or broke. The portions A are illustrated by way of example only and depending on the type of carton blank and its configuration, such internal waste may constitute a variety of things. For example, internal waste areas or portions may be provided adjacent trailing edges of the carton blank to facilitate separation of the edges of the carton blank from the adjacent sheet material. Internal waste areas may also be provided adjacent edges of the carton blanks which might otherwise be difficult to separate from the surrounding material. Such edges may bound irregularly configured indentures or slots to be provided in the carton blank. The portion 21 of the sheet material which surrounds the printed images 18, constitutes waste material as well and may be termed "external waste."

The sheet material 14 is delivered to the cutting unit 11 by a suitable feed arrangement which has not been illustrated. The cutting unit 11 may be of any suitable construction, but as here illustrated includes a pair of rotary cylinders 26, 27 which have their peripheral surfaces rotating adjacent each other to define a cutting nip 28 therebetween and the sheet material is cut as it is advanced through the nip 28. To effect the aforementioned cutting, the cylinders 26, 27 carry projecting members which engage the material at the nip 28. In the preferred embodiment, the cutting is effected by a plurality of projecting lands 30 which are carried by flexible plates, or dies, 31, 32 secured to the cylinders 26, 27 by suitable clamps or grippers, which have not been illustrated. Advancing of the material through the cutting nip 28 is such that the printed images 18 on the sheet material are maintained in registered relationship with the lands 30. The material may also be creased in the cutting nip 28 in desired locations so that the carton blanks may be easily folded to form the finished carton, however, the structure necessary for creasing the blanks has not been illustrated herein. The specific construction of the flexible plates or dies 31, 32 and the specific cutting and creasing modes are known and are disclosed in the United States patent issued to Downie, No. 3,142,233. Sheet material which has been advanced through the cutting nip 28 is guided into the stripper unit 12 by a conventional guiding mechanism, which has not been illustrated.

The stripper unit 12 receives the material guided thereinto and is operable to separate the carton blanks from the waste. The stripper unit 12 includes a pair of rotary cylinders 35, 36 which rotate adjacent each other to define a stripping nip 37 therebetween into which the material is guided.

The positioning of the cylinders 35, 36 relative to the cutting cylinders 26, 27 is such that the stripping nip 37 is spaced a distance from the cutting nip 28 which, in the preferred embodiment, is less than the length of sheet material being processed, as measured in the feeding direction, so that the leading edge of the sheet material is located in the stripping nip 37, while the trailing portion of the sheet is still advancing through the cutting nip 28. Thus the sheet is maintained in registry with parts of the stripping unit 11 which will be defined more fully hereinafter.

The cylinders 35, 36 of the stripper unit 12 and the cylinders 26, 27 of the cutting unit 11 are driven by a common drive mechanism, which has not been shown, and the stripper cylinders 35, 36 and cutting cylinders 26, 27 are all of approximately the same diametrical size and are driven at substantially the same surface speeds from the drive mechanism. The cylinders 35, 36 are driven by meshing gears 35a, 36a, respectively, each of which is secured to its respective cylinder by suitable fasteners.

The cylinders 35, 36 are rotatably supported by side frames 38a, 38b of the stripper unit. The cylinder 35 is supported in the side frames by conventional bearing structures which structures have not been illustrated. The left hand end 40 of the cylinder 36, as viewed in FIG. 3, is fixed to the outer periphery of a shaft member 42 which in turn is supported for rotation about a hollow support member 43 by bearings 44 interposed therebetween. The support member 43 is secured to the side frame 38a by a collar 45 having a circumferential flange thereon connected to the side frame 38a by screws 46. The right end 47 of the cylinder 36, as viewed in the drawings, surrounds an end portion 48 of a hollow support member 49 and is rotatably supported thereon by bearings 50. The other end of the support member 49 is secured to the side frame 38b by bolts which extend through aligned openings in a peripheral flange portion 51 of the support member 49 and the side frame 38b, respectively.

The upper cylinder 35 which may be termed the "carton blank" cylinder, engages the articles or "carton blanks" which have been cut from the sheet material and carries the carton blanks in a path around the periphery of the cylinder upwardly and away from the stripping nip 37. The carton blanks are then released from the cylinder 35 and delivered to a suitable conveying means which carries the carton blanks away from the stripper unit 12 to a subsequent handling operation. This mechanism is not shown for purposes of clarity.

The lower cylinder 36, which may be termed the "broke" cylinder, is operable to remove the waste sheet material from the stripping nip 37. Thus, the cylinders 35, 36 cooperate to separate the carton blanks from the waste by moving the carton blanks and waste in separate directions of travel away from the stripping nip 37. The cylinder 35 may be of any suitable construction and as illustrated includes a sheath 52 which is formed of flexible sheet-like metallic material bent around the circumference of the cylinder and secured to the cylinder by suitable means. The sheath 52 includes a plurality of apertures which are spaced axially along the cylinder and circumferentially thereabout, and into which a plurality of sucker members 53 extend. The sucker members 53 communicate with a vacuum or sub-atmospheric pressure region and engage the carton blanks at the stripping nip 37 and grip the carton blanks to convey the blanks along the periphery of the cylinder as described. The sucker members 53 are associated with suitable valving means to provide the aforementioned suction at the proper time during rotation of the cylinders 35, 36 so that the suckers engage and release the carton blanks as desired. The apparatus associated with the suckers 53 is of the type illustrated and described in U.S. application Ser. No. 509,754, previously referred to.

As noted, the cylinder 36 is effective to convey the external waste away from the nip 37 and includes means for engaging the external waste 21 of the sheet material and for carrying the external waste along the periphery of the cylinder 36 away from the stripping nip 37. Although the means for removing the external waste has not been illustrated in detail, it preferably comprises a plurality of pins 54, which are illustrated in FIGS. 3 and 4, and which pierce the sheet material in the external waste area and convey the external waste downwardly and away from the stripping nip 37 as the cylinder 36 rotates. Since the carton blanks are conveyed upwardly by the cylinder 35 and the external waste is moved downwardly by the cylinder 36, a clean separation of the blanks from the external waste is effected. The external waste 21 is removed from the pins 54 by suitable means, not shown, subsequent to separation thereof from the blanks and such external waste is then free to fall beneath the cylinder 36.

As shown in FIG. 3, the cylinder 36 is hollow and has an axially extending chamber 55 therein and which is defined in part by a circumferentially extending sheath 56 which forms the periphery of the cylinder 36. The sheath 56 is attached at its axial ends to collars 57, 58 forming portions of the ends 40, 47 of the cylinder and is similar to the sheath 52 described hereinabove in connection with the carton cylinder 35 in that it can be a flexible metal-like sheet which is made to conform to the circumference of the cylinder 36 and is held in this cylindrical condition by an axially extending bar 60 to which the ends of the sheath 56 are connected. The bar 60 is suitably attached to the collars 57, 58 at the ends of the cylinder 36 and in the illustrated embodiment, the bar 60 mounts the aforementioned pins 54. Apertures 61 are provided in the sheath 56 and which communicate with the chamber 55. The apertures are located in the sheath 56 so as to be in registry with the areas A of the sheet material as the material 14 is advanced between the cylinders 35, 36. In the embodiment shown in the drawings, the apertures 61 are slightly larger than the broke areas A of the sheet material for a purpose which will be apparent from the following.

A plurality of projections 63 are positioned on the periphery of the cylinder 35 and are registrable with the apertures 61 in the periphery of the cylinder 36 and the broke portions A of the sheet 14. These projections 63 urge the broke portions through the aperture 61.

The projections 63 are registrable with the apertures 61 in the cylinder 36 and the broke portions A of the material in the vicinity of the stripping nip 37. As the cylinders 35, 36 rotate, the projections 63 in the vicinity of the nip extend through their corresponding apertures 61 in the cylinder 36 during a predetermined angular extent of rotation of the cylinders to urge the broke portions A through the apertures 61 and into the broke cylinder 36. The projections 63 may be of any suitable configuration and can be constructed of metallic material or of a firmly resilient material such as cork or a rubber-like composition.

In accordance with the present invention means 64 is provided in the cylinder 36 and cooperates with the projections 63 to provide for reliable separation of the waste area A from the surrounding material. Often the surrounding material and waste areas will not be completely out but will remain connected by stickers. In such a case, when the projection engages the waste area, that waste will tend to pivot about the sticker into the opening rather than being separated from the surrounding material. The means 64 is provided to support the waste areas as they are being moved downwardly by the projections 63, thus, preventing pivoting thereof and providing a reliable separation of the waste from the adjacent material.

In general, the means 64 includes a member 67 within the cylinder 36 which member 67 engages and supports the broke portions A as they are urged through the apertures 61 by the projections 63. More particularly, the member 67 minimizes any pivotal movement of the broke being urged through the apertures and inhibits relative movement between the broke and the projections which might otherwise prevent the projections from cleanly separating the broke.

In the embodiment of the invention illustrated in FIGS. 3–7, the member 67 is a rotatable cylinder or roller having a resiliently deformable peripheral portion 70 which engages an inner periphery of the cylinder 36 and is driven thereby at a surface speed which is substantially the same as the surface speed of the outer peripheral portion of the cylinder 36.

Figure 5:
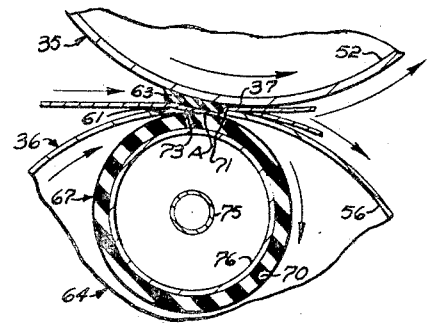
FIG. 5 is a fragmentary sectional view of the apparatus of FIG. 3 in one operative condition thereof.
Figure 6:
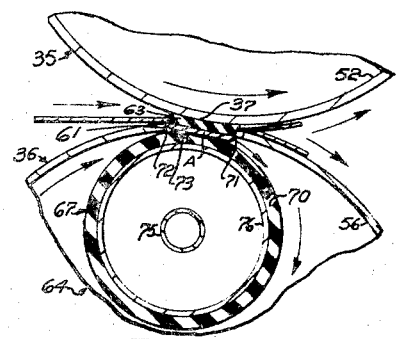
FIG. 6 is a fragmentary sectional view of the apparatus of FIG. 3 in another operative condition thereof.
Figure 7:
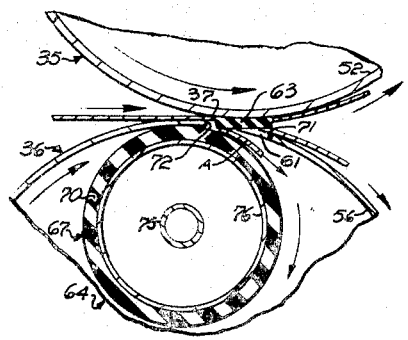
FIG. 7 is a fragmentary sectional view of the apparatus of FIG. 3 in still another operative condition thereof.

The relationship between the projections 63, the apertures 61, and the cylinder 67 in the vicinity of the nip 37, is best shown in FIGS. 5, 6 and 7. As shown in FIG. 5, a projection 63 is approaching the stripping nip 37 with a leading edge, or corner, 71 thereof having moved through the aperture 61 to urge a part of the broke A through the aperture and into engagement with the periphery 70 of the cylinder 67. The mode of engagement between the projection 63 and the broke A is such that the leading edge 71 of the projection punches the leading portion of the broke into the aperture 61 and that portion of the broke is frictionally engaged between the leading edge 71 of the projection and the peripheral portion 70 of the cylinder 67 so that relative movement between the broke and the projection is prevented.

In FIG. 6, the projection 63 is at the stripping nip 37 with the leading edge 71 and a trailing edge 72 thereof extending through the aperture 61 so that a surface 73 thereof is in engagement with the broke portion A and urges the broke against the cylinder or roller 67 over a large area of engagement. It is apparent that as the cylinders 35, 36 rotate from their positions shown in FIG. 5 to their positions shown in FIG. 6, an increasing area of the broke portion A is engaged between the projection 63 and the peripheral portion 70 of the cylinder 67 so that the broke is in effect conveyed between the projection 63 and cylinder 67. The engagement of the broke by the cylinder 67 and projection 63 prevents the broke from pivoting downwardly, as viewed in the drawings, and additionally prevents sliding of the broke relative to the surface 73 of the projection thus insuring punching of the broke from the sheet material 14 as the projection moves into the aperture 61. As shown in FIG. 7, the cylinders 35, 36 have rotated to a position wherein the projection 63 is moving away from the nip 37 with the leading edge 71 of the projection having moved out of aperture 61 and with the trailing edge 72 of the projection 63 continuing to urge a trailing part of the broke portion A against the cylinder 67.

It should be understood that FIGS. 5–7 are somewhat exaggerated to clearly illustrate the cooperation between the projections 63, broke A and the cylinder 67. In actual practice the peripheral portion 70 of the cylinder 67 need not be deformed to the extent indicated in these figures to successfully operate the equipment. The pressure engagement between the cylinder 67 and broke A need only be enough to insure a frictional relationship therebetween sufficient to prevent any substantial relative movement between the projections 63 and the broke so that clean punching of the broke is effected. However, the peripheral portion 70 of the cylinder is sufficiently deflectable to permit it to be deflected away from its normal position when the bar 60 is in the vicinity of the nip 37. In this regard, it should be noted that the bar 60 is relatively thin so that deflection of the cylinder 67 as the bar passes through the vicinity of the nip is minimized.

As shown in FIG. 3, the cylinder 67 is mounted on a shaft member 75 for rotation with respect thereto and which shaft extends through the cylinder on its axis of rotation. The cylinder 67 is a composite member including a cylindrically configured metallic member 76 which is supported at its ends by collars 77, 78 and to which a cylindrical sheath of resilient rubber-like material is suitably fixed to provide the aforementioned resiliently deflectable peripheral portion 70 of the cylinder 67. The collars 77, 78 are rotatably supported on the shaft 75 by suitable bearings 80 so that the cylinder 67 is freely rotatable with respect to the shaft. The left-hand end of the shaft 75, as viewed in the drawings, is suitably fixed to a support 81 which extends through the hollow support member 42 and which includes a flange portion 82 at its extreme left end, secured to the collar 45 by suitable screws, two of which have been illustrated. The right hand end of the shaft 75, as viewed in the drawings, is non-rotatably connected to the hollow support member 49 by a suitable bracket 83 which is held against radial and circumferential movement relative to the member 49 by a screw 84 and a key and keyway arrangement, generally indicated at 85.

As best seen in FIG. 4, a line X between the axis of rotation of the cylinder 67 and the axis of rotation of the cylinder 36 lies at a slight angle, preferably 10°, with respect to a line Y between the axes of rotation of the cylinders 35, 36, so that the peripheral portion 70 of the cylinder 67 engages the inner periphery of the cylinder 36 at a location slightly in advance of the stripping nip 37. This construction provides for gradual increase and reduction of the pressure relationship between the cylinder 67 and projection 63 in the vicinity of the nip 37, and provides space for the broke portions to readily move into the interior of the cylinder 36.

The broke portions A which have been separated from the surrounding material, as described, enter the chamber 55 and are subsequently removed from the chamber by suction. To this end the chamber 55 is maintained at subatmospheric pressure by communication with a suitable source of vacuum, which has not been shown, through a conduit 86. The conduit 86 communicates with the chamber 55 through a connecting chamber 87 formed by the hollow support member 49 and which extends through the side frame 38b between the conduit 86 and the chamber 55. It should be apparent that the separated broke portions in the chamber 55 are moved in a generally axial direction relative to the cylinder 36, through the connecting chamber 87 and into the conduit 86.

FIGS. 8 and 9 illustrate a modified stripper unit embodying the present invention, and wherein parts similar to parts which have previously been described are referred to by corresponding primed reference characters. The cylinders 35', 36' are rotatably supported in the side frames 38a', 38b', to form a stripping nip 37' therebetween and are driven at a common speed by a drive mechanism including meshing gears 35a', 36a', which are fixed to the respective cylinders. The cylinders 35', 36' cooperate to separate the carton blanks and waste as the material 14' advances through the nip 37'. The carton blank cylinder 35' includes the aforementioned sucker members, which have not been shown in this figure, for removing the carton blanks from the cylinder and the projections 63' for engaging internal broke portions of the material 14' in the manner described above. The cylinder 36' includes means for engaging the external waste material and effecting separation thereof from the carton blanks as described above.

The cylinder 36' additionally includes brush means 100 for engaging and supporting broke portions of the material as they are urged through apertures 61' in the periphery thereof by projections 63' on the carton blank cylinder 35' to insure complete separation thereof from the surrounding material. As illustrated in the drawings, the brush means 100 includes a shaft member 101 supported for rotation with respect to the side frames 38a', 38b' by suitable bearing support members, generally indicated at 102a, 102b, a brush member 103 carried by the shaft 101 for rotation therewith, and means for driving the shaft 101. The brush member 103 includes a large number of bristles which extend radially from the axis of rotation of the shaft 101 and are of substantially the same length so that the radially outer ends of the bristles provide a substantially cylindrical peripheral portion 105 of the brush means 90 which peripheral portion engages the inner periphery of the cylinder 36'. The bristles may be attached to the shaft 101 by any suitable means and the mode of attachment is therefore not shown in detail.

The driving means 104 includes an electrically energized drive motor 106, only a portion of which is shown, having a gear 107 fixed to an output shaft 110 thereof. The gear 107 is meshed with a gear 111 fixed to the right hand end of the shaft 101, as viewed in FIG. 8, which end extends outwardly of the side frame 38b' and the bearing support 102b. The drive motor 106 is of conventional construction and is preferably a variable speed motor and is reversible so that the brush 103 can be driven in opposite rotational directions, and at rotational speeds which are adjustably variable relative to the rotational speeds of the cylinders 35', 36'.

The axis of rotation of the brush 103 is preferably located on a line between the axes of rotation of the cylinders 35', 36' with the peripheral portion 105 of the brush engaging the inner periphery of the cylinder 36' adjacent the nip 37' formed between the cylinders 35', 36'. As the projections 63' engage the broke portions of the material passing through the nip 37', and urge the broke portions A through the apertures 61' in the cylinder 36', the bristles of the brush means 100 engage the broke A and support the broke for punching by the projections 63' as the projections approach the nip as well as during movement of the projections away from the nip. When the brush 103 rotates in a clockwise direction, as viewed in FIG. 9, and the peripheral speed of the brush is approximately the same as the peripheral speed of the cylinders 35', 36', the brush means 100 functions similarly to the cylinder 67 described in reference to FIGS. 1–7, in that the peripheral portion of the brush means formed by the bristles of the brush provides a resiliently yieldable support for the broke portion being urged through the apertures 61' by the projections 63' to insure clean separation of the broke. When the drive motor 106 is driving the brush at a peripheral speed which is different from the peripheral speed of the cylinders 36', 35', the bristles engage and support the broke portions A urged through the apertures 61' by the projections 63' and additionally function to brush the broke portions off of the carton blanks and into the chamber 55' to thereby eliminate any stickers which might otherwise causes the broke to remain connected to the surrounding material.

FIG. 9 illustrates a further modification of a stripper unit embodying the present invention, and wherein parts similar to parts previously described are indicated by corresponding reference characters having a double prime notation. The modified stripper unit 12" is similar in most respects to the unit 12 of FIGS. 1–7 except that the cylinder 67 is replaced by an endless belt 120 trained around idler pulleys, or shafts, 121–124 which are positioned within the cylinder 36" and are freely rotatable with respect thereto. The idlers 121, 122 which support an upper run 126 of the belt 120, as viewed in FIG. 10, are positioned relative to the inner periphery of the cylinder 36" so that a point on the run 126 is in frictional driving engagement with the cylinder 36" at a point thereon which is approximately 10° of rotation in advance of the nip 37". The idlers 121–124 are positioned so that the upper run 126 of the belt provides a generally cylindrical surface segment from the point of driving engagement thereof with the cylinder 36" to the idler 123.

The belt 120 is composed of a flexible material and provides a resiliently deflectable surface for supporting the broke portions A of the material urged thereagainst by the projections 63" of the cylinder 35" so that the severing of broke portions A from the carton blanks is effected thereby in a manner quite similar to that described above in reference to FIGS. 1–7. The idlers 121–124 preferably extend the length of the cylinder 36" and although only a single belt 120 has been illustrated in FIG. 9, it should be apparent that any number of belts 120 could be provided according to the number and locations of broke portions A desired to be removed from the material.

Although several embodiments of the present invention have been illustrated and described herein in considerable detail, the present invention should not be considered to be limited to the precise constructions shown. It is our intention to cover hereby, all adaptations, modifications and uses of the present invention, which come within the scope of the appended claims.

Having described our invention, we claim:

1. An apparatus for separating portions of sheet-like material comprising a first rotatable member having an axially extending opening therein for receiving waste portions of said material, means defining an aperture in the periphery of said first rotatable member and communicating with said axially extending opening, a second member registrable with said aperture to move a waste portion of the material into said axially extending opening through said aperture, and means in said axially extending opening for engaging and supporting said waste portion of the material as it is moved by said second member.

2. An apparatus as defined in claim 1 wherein said means in said axially extending opening includes a support member positioned within said first member and having a peripheral portion engageable with said waste portion of the material as said second member moves said waste portion toward said axially extending opening to support said waste portion of the material against pivotal movement into said axially extending opening.

3. Apparatus as defined in claim 2 wherein said second member urges said waste portion of the material into engagement with said peripheral portion of said support member, and with said peripheral portion of said support member effective to prevent any substantial movement of said waste portion of the material relative to said second member when second member is in said aperture.

4. Apparatus as defined in claim 3 wherein said surface portion of said support member is movable and driven by said first member and with said peripheral portion of said support member moving as said waste portion of the material is engaged and supported thereby.

5. Apparatus as defined in claim 4 wherein said peripheral portion of said support member includes a roller formed at least in part by a rubber-like material.

6. Apparatus as defined in claim 4 wherein said support member includes an endless belt trained around shaft means rotatably supported within said first member.

7. Apparatus as defined in claim 2 and wherein said support member includes a peripheral portion engaging and supporting said waste portion of the material and further including means for driving said support member and operable to move said peripheral portion thereof at a speed which is different from the speed of said periphery of said first member.

8. Apparatus as defined in claim 7 and wherein said support member includes a brush comprising a plurality of radially extending bristles, with said peripheral portion of said support member being formed by ends of said bristles.

9. Apparatus for separating portions of sheet-like material comprising, first and second rotatable nip forming cylinders, said first cylinder having a first axially extending opening therein and a second opening extending between a peripheral surface of said first cylinder and said first opening, said second cylinder including a member registrable with said second opening in said first cylinder and effective to urge a waste portion of the material into said first opening when said member and said second opening are in the vicinity of said nip, and a support member positioned in said first opening in said first cylinder, said support member including a surface portion engageable with the waste portion of the material being urged through said second opening by said member in advance of said nip and continuously engaging and supporting the waste portion as said member moves through said nip.

10. Apparatus as defined in claim 9 wherein said member urges the waste portion a first distance into said first opening in advance of said nip and urges the waste portion a second greater distance into said first opening at said nip.

11. Apparatus as defined in claim 10 wherein said support member is a roller member having an axis of rotation extending substantially parallel to axes of rotation of said first and second cylinders and with a line between said axis of rotation of said roller and said axis rotation of said first cylinder lying at an acute angle to a line between said axes of rotation of said first and second cylinders, said axis of rotation of said roller member being in advance of said nip.

12. Apparatus as defined in claim 10 wherein said support member includes a resiliently deflectable surface portion engaging said waste portion of the material as said waste portion is being urged into said first opening.

13. Apparatus as defined in claim 12 wherein said support member includes a roller member and with said surface portion formed by a rubber-like material.

14. Apparatus as defined in claim 12 wherein said support member includes an endless belt movably supported in said first cylinder and driven thereby.

15. Apparatus for separating portions of sheet-like material comprising first and second rotatable nip forming cylinders, said first cylinder having a first axially extending opening therein and a second opening extending between the peripheral surface of said first cylinder and said first opening, said second cylinder including a member registrable with said second opening in said first cylinder and effective to urge a waste portion of the material into said second opening when said member and said second opening are in the vicinity of said nip, and a support member positioned in said first opening in said first cylinder, said support member including a resilient portion engageable with the waste portion of the material being urged through said second opening by said member.

16. Apparatus as defined in claim 15 wherein said support member engages and supports said waste portion of the material at said nip and maintains engagement with said waste portion as said member moves away from said nip.

17. Apparatus as defined in claim 16 wherein said support member includes a brush member having a plurality of closely spaced bristles forming said resilient portion.

18. Apparatus as defined in claim 15 wherein said resilient portion includes a generally cylindrical surface composed of a rubber-like material.

19. Apparatus as defined in claim 15 wherein said support member is a roller member rotatably supported in said first cylinder and driven thereby.

20. Apparatus as defined in claim 15 wherein said support member includes an endless belt movably supported within said cylinder and driven thereby.

21. Material handling apparatus including first and second rotatable nip forming members, said first member including a first axially extending opening therein and a second opening extending between said axially extending opening and a periphery of said member, a third member supported in said axially extending opening of said first member, said second member including a part registrable with said second opening in said first member and said part and said third member cooperable with a portion of the material handled by said appartus to engage and advance said portion of the material between said second and third members in a direction of travel different from the direction of travel of the material adjacent said portion.

References Cited

UNITED STATES PATENTS

| 709,789 | 9/1902 | Meek. |
| 2,888,860 | 6/1959 | Baumgartner. |
| 3,117,499 | 1/1964 | Golding. |

BERNARD STICKNEY, *Primary Examiner.*